Patented Oct. 26, 1954

2,692,891

UNITED STATES PATENT OFFICE 2,692,891

PRODUCTION OF THIOPHOSPHATE ESTERS

James W. Young, Coraopolis, and Jack Hensel, Sewickley, Pa., assignors to Pittsburgh Coke & Chemical Company, Pittsburgh, Pa., a corporation of Pennsylvania No Drawing. Application November 24, 1950, Serial No. 197,489

6 Claims. (Cl. 260—461)

This invention relates to the production of phosphorous-containing esters and is particularly concerned with new procedures for the preparation of mixed thiophosphate esters.

FIELD OF INVENTION

Mixed thiophosphate esters, e. g., dialkyl monoaryl thiophosphates, have assumed considerable commercial importance because of many unique properties of such compounds which make them useful as plasticizers, insecticides flame-proofing agents, and for other uses. The commercial production of the mixed esters of thiophosphoric acid in substantial quantities presents a number of problems, particularly if the products are to be obtained in good yield and with high purity. For example, there is a great tendency in the production of the mixed esters, for them to be contaminated with the corresponding trialkyl esters or to be contaminated with the phenols of which the esters are composed. Also, yields of products obtainable heretofore have left much to be desired.

OBJECTS

A principal object of this invention is the provision of new procedures for the production of mixed esters of thiophosphoric acid. Further objects include:

(1) The elimination of the use of added organic solvents in carrying out the reactions for production of dialkyl monoaryl esters of thiophosphoric acid.

(2) The provision of such procedures which can be carried out in a continuous fashion.

(3) The provision of such procedures in which the desired product is obtained in unusually high yields with no appreciable contamination by related esters which normally might be produced in the reactions used to prepare the desired products.

(4) Increasing the rates of reaction for various stages of the subject ester production, so that the overall process can be carried out in a relatively short time.

(5) The production of thiophosphate esters using water as a reaction medium.

(6) The provision of such procedures which are generally applicable to the preparation of a large variety of mixed thiophosphate esters.

(7) The provision of new improvements in thiophosphoric acid ester preparations which make possible the easy removal of unused portions of reactants, whereby desired products of high quality and purity may be obtained.

(8) The provision of a new procedure for the condensation of phenols or alcohols with dialkyl thiophosphoryl halides to form tri-substituted esters using water as a reaction medium while still obtaining a high percentage yield of desired product.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention in the production of phosphorous-containing esters of the general formula:

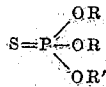

wherein R is a lower alkyl radical, and R' is an alkyl radical different from R, or an aryl radical, by bringing together in a continuous streamwise reaction a solution of a sodium alkoxide in the corresponding alcohol and thiophosphoryl chloride, at a temperature between about −10° and +30° C. in proportion of between 2 and 2.1 mols of sodium alkoxide for each mol of the chloride, allowing said materials to react in the absence of any additional solvent to form a thiophosphorous ester chloride of the general formula:

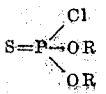

dissolved in said alcohol, providing an aqueous solution of a sodium salt having the formula: NaOR' (or the chemical equivalent thereof) containing a minor quantity of a catalyst, e. g., copper powder or copper salts, intensively agitating said aqueous solution, adding said ester chloride streamwise to said agitated solution, allowing the admixed materials to completely react at a temperature between 30° and 100° C., and recovering the resulting thiophosphorus ester from the reaction mixture.

The success of this invention is due, to a large extent, to the discovery that water can be utilized as a reaction medium for at least part of the condensation forming the esters of the type indicated above in excellent yields when a catalyst is employed. In the past, it has been generally considered essential to carry out these ester productions using organic solvents, because it apparently has been felt that the use of water as a reaction medium would produce hydrolysis or contamination of the product with by-product esters. It has been surprisingly found, on the contrary, that not only can water be used in the procedures as a reaction medium, but, furthermore, that when this is done in conjunction with a catalyst, unreacted portions of reactants used in the preparations may be very easily separated from the desired products, thus producing materials of high purity.

The success of the invention is also due to the further discovery that added organic solvents can be eliminated in the procedures and that excess of the reacting alcohols can serve as diluents in the process. The general procedure, in the past, has been to use substantial quantities of organic solvents in order to provide a dilution medium in the production of these mixed esters, apparently because it was felt that the use of an excess of reacting alcohol for this purpose would result in the formation of triesters instead of mixed esters. Surprisingly, it has been found, as a result of this present invention, that not only can the use of extraneous solvents be eliminated, but when this is done, reaction rates can be increased with production of higher yields in shorter periods of time.

EXAMPLES

A more complete understanding of the new procedures involved with this invention can be had by reference to the following examples of actual operations in accordance with this invention.

*Example I*

This example illustrates the preparation of diethyl p-nitrophenyl thiophosphate (Parathion).

23.4 parts of metallic sodium are added to 310 parts of anhydrous ethanol to form a solution of sodium ethoxide in ethanol. After complete reaction of the sodium, the solution is added streamwise over a period of one-half hour to 84.7 parts of thiophosphoryl chloride. The temperature in the reactor is maintained at —6° C. by suitable cooling during the addition and then the temperature is raised to 0° C. and held for one-half hour.

The resulting solution is discharged into 1300 cc. of water and the diethoxythiophosphoryl chloride product layer is separated by gravity from the water layer. The collected diethoxythiophosphoryl chloride layer is added over a period of one hour at 70 to 75° C. to a mix of 73 parts of p-nitrophenol, 21.2 parts of NaOH, 2 parts of Cu powder, and 300 cc. of water. (With the exception of the diethoxythiophosphoryl chloride, the above reactants had been pre-mixed and heated to 75° C.) At the end of the diethoxythiophosphoryl chloride addition, 5 parts of $Na_2CO_3$ are added and the mix is further reacted for one hour at 70 to 75° C. The entire mix is then filtered and the diethyl p-nitrophenyl thiophosphate layer is separated by gravity from the water layer. The overall yield is 86% of theory with a purity of 99% (by polarographic analysis).

*Example II*

This example illustrates the production of dimethyl p-nitrophenyl thiophosphate.

A procedure similar to that described in Example I is used. However, methanol is used in place of ethanol, the temperature during the dimethoxy thiophosphoryl chloride preparation is about —10° C., and the temperature during the final product preparation is 60 to 65° C. The yield of dimethyl p-nitrophenyl thiophosphate is 73.5% of theory with a purity of 93%.

*Example III*

The procedure of Example I is repeated, using 4 parts of $CuSO_4.5H_2O$ in place of the 2 parts of copper powder. Substantially the same results as in Example I are obtained.

OPERATIONAL DETAILS

As has been indicated above, the new procedures of this case are applicable to a large variety of mixed phosphorous-containing esters. Particularly useful as hydroxyl-containing reactants are the lower alkyl alcohols, including ethanol, methanol, 1 or 2-butanol, 1 or 2-propanol, various pentanols, or mixtures of these lower alkyl alcohols.

For the third substituent, the mixed esters can contain a large variety of aryl or alkyl groups, so that various phenols or alcohols may be used as essential reactants. Usable phenolic materials include: p-nitrophenol; 2,4-dinitrophenol; 2,4-dichlorophenol; 2-hydroxy-4-nitronaphthalene; 2-methyl-4-nitrophenol; p-cresol and 2-chloro-4-nitrophenol. The usable alcohols are numerous and include the simple alkanols which should be different from the lower alkyl alcohols mentioned above, or complex hydroxy compounds, such as hydroxy thioethers, glycol ethers, β-methyl umbelliferone, or the like.

Using such reactants, examples of the preferred mixed esters which can be produced by these new procedures include: diethyl p-nitrophenyl thiophosphate, dimethyl p-nitrophenyl thiophosphate, dibutyl phenyl thiophosphate, dimethyl 2,4-dichlorophenyl thiophosphate, diamyl p-tolyl thiophosphate, diethyl naphthyl thiophosphate.

The proportions of reactants at various stages of the process can be varied. However, in order to obtain the highest yield and best quality of product, various limits of proportions should be observed. Thus, preferably between 2 and 2.1 mols of sodium alkoxide for each mol of thiophosphoryl halide compound should be used in the first stage of the reaction. Preferably, the sodium alkoxide should be used as a 10 to 25% solution in the alcohol corresponding to the alkoxide.

The amount of water used as the reaction medium can be varied, but in diluting the ester chloride containing solution formed in the first stage of the reaction, at least about 100 mols of water for each mol of thiophosphoryl compound originally used should be added and, preferably, between 100 and 200 mols of water per mol of thiophosphoryl compound are used.

The concentration of the aqueous solution of phenolic compound or its equivalent used in the second stage of the reaction is not critical, but a solution containing between about 5 and 30% by weight of the sodium salt of the desired phenolic material is employed. The preferable ratio of phenolic solution to ester chloride containing solution can be based upon the amount of thiophosphoryl compound originally used and is advantageously between 0.8 and 1.5 mols of the phenolic material to each mol of thiophosphoryl chloride originally used. Instead of a solution of the sodium phenolate, a mixture of the phenol with NaOH, Na₂CO₃ or equivalent mixture which will yield a sodium phenolate may be employed.

The temperature used in the reaction at various states may be varied, but for greatest yield and purity of product, certain limits should be observed. In the first stage of the reaction leading to the ester chloride solution, temperatures between −10 and +30° C. are employed. In the second stage of the reaction, leading to the production of the final mixed ester, temperatures between 30 and 100° C., with the optimum at about 70° to 75° C., are employed.

Various materials have been found to be useful as the catalyst in the second stage of the process. Usable substances include finely divided copper metal, copper oxide, copper sulfate, copper chloride, copper acetate, mixtures thereof, or similar heavy metals, salts or compounds. Preferably, the catalyst is used in such amount that the concentration thereof in the reaction medium is between 1 to 10 grams per mol of the phosphorous chloride originally used.

The reaction is not dependent upon any special type of apparatus and various standard types of equipment can be used at all stages of the reaction. However, one advantage of the new processes is the fact that they can be carried out in a continuous manner, this being made possible because of the increased reaction rates for the various stages of the procedure. Accordingly, the known types of continuous reactors for reacting streamwise portions of materials can be advantageously used.

Known expedients in the separation and other steps of the procedures can be used. For example, in separating the desired product from the reaction mixture, removal of unreacted phenolic materials can be carried out by washing the reaction product with alkaline reagents, such as sodium carbonate, trisodium phosphate, sodium hydroxide, calcium hydroxide, and the like. Likewise, further purification of the final product can be obtained by steam distillation. Similarly, additional modifications and added features in the general procedures can be utilized, as will be apparent to the skilled chemist, e. g., reaction times in various steps will be varied and should be sufficiently long to allow for complete reaction of admixed reagents.

CONCLUSION

Using the new procedures provided by this invention, as described above, it is possible to produce mixed thiophosphate esters in a continuous fashion at high reaction rates and with excellent yields of high quality product containing little to no contaminants. While the procedures are particularly useful in the preparation of dialkyl monoaryl esters of thiophosphoric acid, such as parathion, or related products, the procedures are applicable to other mixed phosphate esters.

We claim:

1. In a process for the production of mixed thiophosphoric esters, the steps which comprise providing an aqueous solution of a compound having the formula: NaOR', wherein R' is an aryl radical, containing a catalyst from the group consisting of copper metal powder and copper salts, vigorously agitating the solution, mixing a chloride having the general formula:

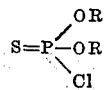

wherein R is an alkyl radical with said agitated solution, allowing said admixed materials to react at a temperature between 30 and 100° C. and recovering a mixed thiophosphoric ester from the reaction mixture.

2. In a process for the production of mixed esters of thiophosphoric acid, the steps which comprise providing a 5 to 30% aqueous solution of a compound of the formula: NaOR', wherein R' is an aryl radical, containing about 1 to 10 grams per mol of said compound of a catalyst from the group consisting of copper metal powder and copper salts, vigorously agitating said solution, mixing a dialkyl thiophosphoryl chloride with said agitated solution, allowing said admixed materials to react at a temperature between 30 and 100° C. and recovering a mixed thiophosphoric ester from the reaction mixture.

3. In a process for the production of dialkyl monoaryl thiophosphates, the steps which comprise providing a 5 to 30% aqueous solution of a sodium phenolate containing 1 to 10 grams per mol of phenolate of a catalyst from the group consisting of copper metal powder and copper salts, vigorously agitating said solution, adding a dialkyl thiophosphoryl chloride streamwise to said agitated solution, allowing said admixed materials to react at a temperature between 30 and 100° C. and recovering a dialkyl monoaryl thiophosphate from the reaction mixture.

4. In a process for the production of parathion, the steps which comprise providing a 5 to 30% aqueous solution of sodium p-nitrophenolate containing 1 to 10 grams per mol of phenolate of a catalyst from the group consisting of copper metal powder and copper metal salts, vigorously agitating said solution, adding streamwise to said agitated solution diethyl thiophosphoryl chloride, allowing said admixed reagents to react at a temperature of 30 to 100° C. until the reaction is complete, and recovering parathion from the resulting aqueous reaction mass.

5. In a process for the production of dimethyl-p-nitrophenyl thiophosphate, the steps which comprise providing a 5 to 30% aqueous solution of sodium p-nitrophenolate containing 1 to 10 grams per mol of phenolate of a catalyst from the group consisting of copper metal powder and copper metal salts, vigorously agitating said solution, adding streamwise to said agitated solution dimethyl thiophosphoryl chloride, allowing said admixed reagents to react at a temperature of 30 to 100° C. until the reaction is complete, and recovering dimethyl p-nitrophenyl thiophosphate from the resulting aqueous reaction mass.

6. In a process for the production of mixed thiophosphoric esters, the steps which comprise providing an aqueous solution of a compound having the formula: NaOR', wherein R' is an aryl radical, containing a copper catalyst, vigorously agitating the solution, mixing a chloride having the general formula:

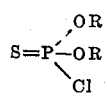

wherein R is an alkyl radical with said agitated solution, allowing said admixed materials to react at a temperature between 30 and 100° C. and recovering a mixed thiophosphoric ester from the reaction mixture.

References Cited in the file of this patent

UNITED STATES PATENTS

| Number | Name | Date |
|---|---|---|
| 1,844,408 | Nicolai | Feb. 9, 1932 |
| 2,471,464 | Toy | May 31, 1949 |
| 2,520,393 | Fletcher | Aug. 29, 1950 |
| 2,536,647 | Kosolapoff | Jan. 2, 1951 |
| 2,575,225 | Manske et al. | Nov. 13, 1951 |
| 2,624,745 | Schrader | Jan. 6, 1953 |

OTHER REFERENCES

Fletcher et al., J. A. C. S., vol. 70, pp. 3943–3944 (1948).

Fletcher et al., J. A. C. S., vol. 72, pp. 2461–2464 (June 1950).